United States Patent
Wade et al.

(10) Patent No.: US 11,434,988 B2
(45) Date of Patent: Sep. 6, 2022

(54) PULLEY INSERT

(71) Applicant: Ford Global Technologies, LLC, Dearborn, MI (US)

(72) Inventors: Robert Andrew Wade, Plymouth, MI (US); Ada Kwok, Campbellfield (AU); Thomas Fisk, London (GB); Jason Moores, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 446 days.

(21) Appl. No.: 16/568,070

(22) Filed: Sep. 11, 2019

(65) Prior Publication Data

US 2020/0088271 A1 Mar. 19, 2020

(30) Foreign Application Priority Data

Sep. 13, 2018 (GB) ...................................... 1814925

(51) Int. Cl.
*F16H 55/36* (2006.01)
*F16H 55/40* (2006.01)
*F16H 55/52* (2006.01)

(52) U.S. Cl.
CPC ............. *F16H 55/36* (2013.01); *F16H 55/40* (2013.01); *F16H 55/52* (2013.01); *F16H 2055/366* (2013.01)

(58) Field of Classification Search
CPC .......... F16H 55/36; F16H 55/40; F16H 55/46; F16H 55/52; F16H 55/566;

(Continued)

(56) References Cited

U.S. PATENT DOCUMENTS 4,355,990 A * 10/1982 Duncan, Jr. ............... F16D 3/68
464/74
5,441,456 A 8/1995 Watanabe et al.
(Continued)

FOREIGN PATENT DOCUMENTS

DE 102004060172 A1 * 7/2005 ............ F16F 15/126
EP 0477146 A2 3/1992
(Continued)

OTHER PUBLICATIONS

Great Britain Intellectual Property Office, Combined Search and Examination Report under Sections 17 and 18(3) Issued in Application No. GB1814925.2, dated Feb. 26, 2019, 6 pages.

(Continued)

*Primary Examiner* — Michael R Mansen
*Assistant Examiner* — Raveen J Dias
(74) *Attorney, Agent, or Firm* — Vincent Mastrogiacomo; McCoy Russell LLP

(57) ABSTRACT

Methods and systems are provided for a pulley insert. In one example, a pulley insert for a FEAD pulley comprises a first member insertable into a pulley such that the first member is rotatable within the pulley, the first member comprising a cavity for receipt of a second member; and a second member insertable into the cavity of the first member such that, when the first member is inserted into a pulley and the second member is inserted into the cavity of the first member, the second member prevents rotation of the first member relative to the pulley.

18 Claims, 5 Drawing Sheets

(58) Field of Classification Search
CPC ........ F16H 2055/363; F16H 7/12; F16H 7/14; F16H 7/16; F16H 7/1209; F16H 7/1254
See application file for complete search history.

(56) References Cited

U.S. PATENT DOCUMENTS

| | | | |
|---|---|---|---|
| 5,449,322 A | 9/1995 | Wagner | |
| 5,899,811 A * | 5/1999 | Kishibuchi | F16D 7/048 464/30 |
| 6,019,692 A | 2/2000 | Kojima et al. | |
| 8,397,602 B2 * | 3/2013 | Christenson | F16F 15/126 74/574.4 |
| 2004/0009818 A1 * | 1/2004 | Son | F16D 7/04 464/32 |
| 2005/0209009 A1 * | 9/2005 | Son | F16H 55/36 464/32 |
| 2006/0293137 A1 | 12/2006 | Lopes | |
| 2008/0034918 A1 * | 2/2008 | Manzoor | F16F 15/1442 74/574.4 |
| 2010/0029422 A1 * | 2/2010 | Riu | F16D 7/022 474/94 |
| 2010/0230227 A1 * | 9/2010 | Parsons | F16D 27/105 192/65 |
| 2010/0255943 A1 * | 10/2010 | Cali | F16H 55/48 474/94 |
| 2011/0281678 A1 * | 11/2011 | Cali | F16D 3/02 474/171 |
| 2012/0149511 A1 * | 6/2012 | Hodjat | F16D 3/10 474/94 |
| 2012/0168276 A1 * | 7/2012 | Cali | F16D 41/06 192/41 R |
| 2012/0172163 A1 | 7/2012 | Fitz | |
| 2013/0252745 A1 * | 9/2013 | Shirai | F16F 15/1245 464/73 |
| 2013/0337952 A1 * | 12/2013 | Berruet | F16F 15/1245 474/94 |
| 2013/0337953 A1 * | 12/2013 | Berruet | F16D 3/68 474/94 |
| 2013/0341150 A1 * | 12/2013 | Ikegawa | F16D 27/105 192/80 |
| 2015/0141182 A1 * | 5/2015 | Mandel | B22F 3/12 474/94 |
| 2015/0252885 A1 | 9/2015 | Manzoor | |
| 2015/0354689 A1 * | 12/2015 | Manzoor | F16F 15/1442 474/94 |
| 2016/0033005 A1 | 2/2016 | Manzoor | |
| 2017/0082170 A1 | 3/2017 | Oh | |
| 2017/0248219 A1 | 8/2017 | Kvasnicka et al. | |
| 2017/0292583 A1 * | 10/2017 | Manzoor | F16H 55/36 |
| 2017/0292599 A1 * | 10/2017 | Basile | F16C 19/16 |
| 2018/0023658 A1 * | 1/2018 | Shah | F16H 55/36 464/51 |
| 2019/0078677 A1 * | 3/2019 | Choi | F16H 55/36 |

FOREIGN PATENT DOCUMENTS

| | | |
|---|---|---|
| JP | 2002364667 A | 12/2002 |
| JP | 2004232778 A | 8/2004 |
| JP | 2004257404 A | 9/2004 |
| JP | 2005201433 A | 7/2005 |
| KR | 19980053842 A1 | 10/1998 |
| WO | WO-2004079191 A1 * | 9/2004 ......... F04B 27/0895 |
| WO | 2013153219 A1 | 10/2013 |

OTHER PUBLICATIONS

European Patent Office, Office Action Issued in Application No. 19195052.6, dated Apr. 15, 2021, Germany, 6 pages.

* cited by examiner

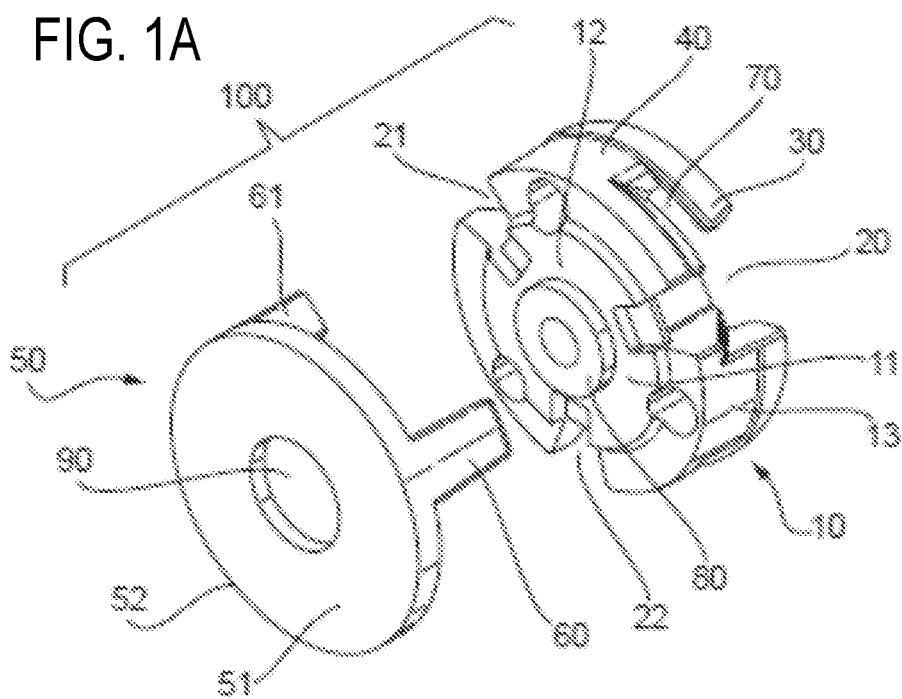

PULLEY INSERT

CROSS REFERENCE TO RELATED APPLICATION

The present application claims priority to United Kingdom patent application No. 1814925.2, filed on Sep. 13, 2018. The entire contents of the above-listed application are hereby incorporated by reference for all purposes.

FIELD

The present description relates generally to an insert for noise reduction, for example a crankshaft vibration damper insert. In one example, a noise reduction insert is a pulley (e.g. a pulley on an internal combustion engine or electric motor). In one example, the disclosure may relate to a noise reduction insert for a front end accessory drive (FEAD) pulley. In one example, the invention relates to a vibration damper noise reduction insert.

BACKGROUND/SUMMARY

During engine operation, the load of the engine can be carried by parts of an internal combustion engine (ICE) or electric motor, (e.g. the front end accessory drive (FEAD)) as motion from the reciprocating piston engines is imparted to part of the FEAD. For example, motion from the reciprocating piston engines may be imparted into at least one of an AC compressor pulley, a water pump pulley, a crankshaft (drive) pulley (e.g. a pulley coupled to a crankshaft), an alternator pulley, and a power steering pump pulley. In one example, the full load of the engine may be carried by the engine crankshaft as motion from the reciprocating piston engines is imparted to the crankshaft.

In order to control noise, a noise reduction insert can be provided at one end of a pulley, (e.g. a FEAD pulley), for example, integrated into the FEAD pulley, as FEAD pulleys are parts of the ICE that are susceptible to high levels of vibration and therefore susceptible to emitting high levels of noise. For example, a FEAD pulley or vibration damper can act to transmit vibrations of the crankshaft that become airborne noise. A noise, vibration and harshness (NVH) cover, or insert, may be provided within a FEAD pulley (e.g. a crankshaft pulley) or vibration damper (e.g. a crankshaft vibration damper) to mitigate noise, e.g. resulting from vibration of the FEAD pulley itself.

However, there are some issues with previous examples of NVH covers. In one example, ergonomic forces associated with the insertion of the NVH cover may be above a level desired for assembly workers, resulting in a high level of difficulty of assembly. This may lead to inaccurate installations and increased assembly costs. Furthermore, barbs that seat behind a crank damper pulley may degrade during assembly, resulting in insufficient retention of the NVH cover. Additionally, another issue associated with previous examples of the NVH cover include a lack of indication to the assembly worker when the NVH cover is correctly installed with the barbs seated properly behind the crank damper pulley.

In one example, the issues described above may be addressed by an insert, for example a noise reduction insert, for a pulley comprising a first member insertable into a pulley such that the first member is rotatable within the pulley, the first member comprising a cavity for receipt of a second member; and a second member insertable into the cavity of the first member such that, when the first member is inserted into a pulley and the second member is inserted into the cavity of the first member, the second member prevents rotation of the first member relative to the pulley. Herein by 'pulley' it is also meant 'vibration damper', and hence according to the first arrangement there may be provided an insert (e.g. a noise reduction insert), for a vibration damper (e.g. a crankshaft vibration damper).

The insert may be a noise reduction insert and is for a pulley. In one example, the noise reduction insert may be for a pulley on an ICE or electric motor. In one example, the noise reduction insert may be for a FEAD pulley. For example, the noise reduction insert may be for an AC compressor pulley, a water pump pulley, a crankshaft (drive) pulley (e.g. a pulley coupled to a crankshaft), an alternator pulley, or a power steering pump pulley. In one example, the noise reduction insert may be for a crankshaft vibration damper, e.g. a crankshaft vibration damping insert. In this way, the two-piece NVH cover may decreased the ergonomic forces generated during assembly while also provided feedback regarding when installation is complete (e.g., correct).

As will be described further below, the disclosure provides a two-piece, or two-component, insert, or cover, insertable into a pulley such that the second piece blocks relative movement of the first piece. As will also be described below, the first member is rotatable within the pulley, and rotatable to a position in which the first member is retained within the pulley. Specifically, the first member is rotatable to secure itself within the pulley. More specifically, the first member is rotatable to lock itself above at least one spoke of the pulley, (e.g. the first member is rotated into a locked position). The second member is then insertable about the first member so as to block further rotation. Therefore, the second member may be insertable about the first member so as to lock the first member in place. This may block the first member from rotating (in an opposite direction) out of its locked position above a spoke of the pulley's spokes.

The second member may comprise a second member limb insertable within the cavity, such that, when first member is inserted into a pulley and the second member is inserted into the cavity of the first member, the second member limb may be inserted into the cavity of the first member, and wherein engagement between the first member and second member limb may block rotation of the first member relative to the pulley.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1A and 1B show, respectively, front and rear perspective views of an example vibration damper insert.

FIGS. 1A to 4 are shown approximately to scale. However, other relative dimensions may be used if desired.

DETAILED DESCRIPTION

Figure 2A:
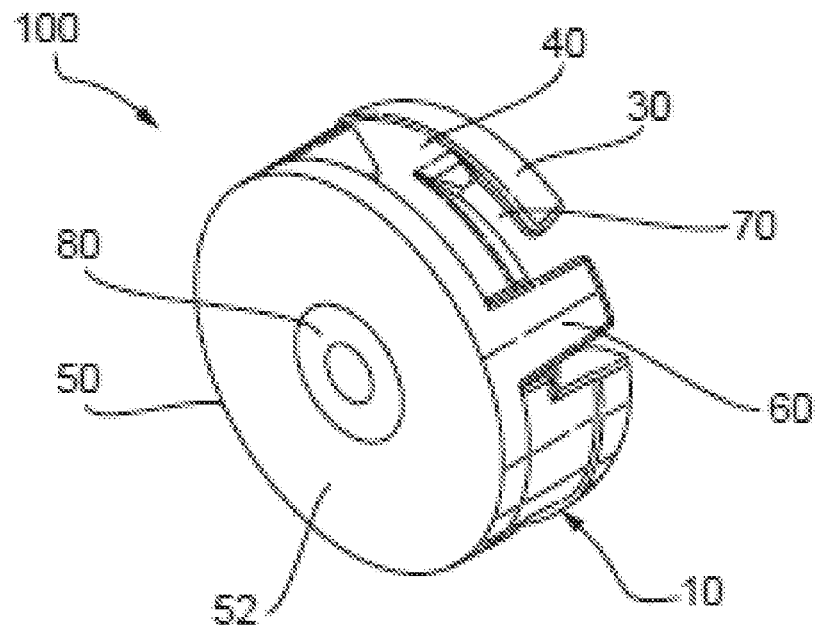
FIGS. 2A and 2B show, respectively front and rear perspective views of the vibration damper insert of FIGS. 1A and 1B.

The following description relates to systems and methods for an insert for a front end accessory drive (FEAD) pulley comprising a first member insertable into a FEAD pulley such that the first member is rotatable within the FEAD pulley, the first member comprising a cavity for receipt of a second member; and a second member insertable into the cavity of the first member such that, when the first member is inserted into a FEAD pulley and the second member is inserted into the cavity of the first member, the second member prevents rotation of the first member relative to the FEAD pulley. The second member comprises a second member limb insertable within the cavity, such that, when first member is inserted into a FEAD pulley and the second member is inserted into the cavity of the first member, the second member limb is inserted into the cavity of the first member, and wherein engagement between the first member and second member limb blocks rotation of the first member relative to the FEAD pulley. The first member comprises a first member body and wherein the cavity is a gap in the first member body. The first member comprises a first member limb, wherein the first member limb is a protrusion away from the body. The cavity is at least partially defined by the first member limb. The first member limb extends from a peripheral surface of the first member body. The first member limb comprises a protrusion extending away from the first member limb and defining a slot delimited by the first member body, the first member limb, and the protrusion, wherein the slot is for receipt of an element of the FEAD pulley. The protrusion comprises a lip extending away from the first member body, the lip being configured to, when the first member is inserted into a FEAD pulley, retain the first member within the FEAD pulley by a snap-fit arrangement. The first member is inserted into a FEAD pulley, rotation of the first member within the FEAD pulley in a first direction causes at least part of the FEAD pulley to be received in, and engage, the slot, wherein engagement between the protrusion and the part of the FEAD pulley received in the slot retains the first member within the FEAD pulley. The first member is inserted into a FEAD pulley and the second member is inserted into the cavity of the first member, at least part of the FEAD pulley is located within the cavity. The first member comprises a boss extending from a first member surface and the second member comprises an opening in a second member surface, the opening being configured to receive the boss, and wherein, when the second member is inserted into the cavity of the first member, the boss is received in the opening such that the boss and the second member surface form a single surface.

A FEAD pulley assembly comprises an insert and a FEAD pulley comprising an inner hub, an outer hub, and at least one spoke joining the inner hub to the outer hub; wherein, the first member is insertable into the FEAD pulley such that the first member is rotatable within the FEAD pulley such that the slot may be rotated into engagement with a spoke, and wherein engagement between the spoke and at least one of the first member body, the first member limb, and the protrusion retains the first member within the FEAD pulley. A FEAD pulley comprising an inner hub, an outer hub, and at least one spoke joining the inner hub to the outer hub, wherein, when the first member is inserted into the FEAD pulley and the second member is inserted into the cavity of the first member, at least part of one spoke is received into the cavity such that the second member is located in between the spoke and the first member.

A method comprises inserting the first member into a FEAD pulley, inserting the second member into the FEAD pulley such that at least part of the second member is received into the cavity of the first member. Providing an insert comprising a first member and second member, the first member comprising a cavity for receipt of the second member, inserting the first member of the vibration damper insert into a FEAD pulley such that the first member is rotatable within the FEAD pulley, and inserting a second member into the cavity of the first member such that rotation of the first member relative to the FEAD pulley is blocked.

Figure 2B:
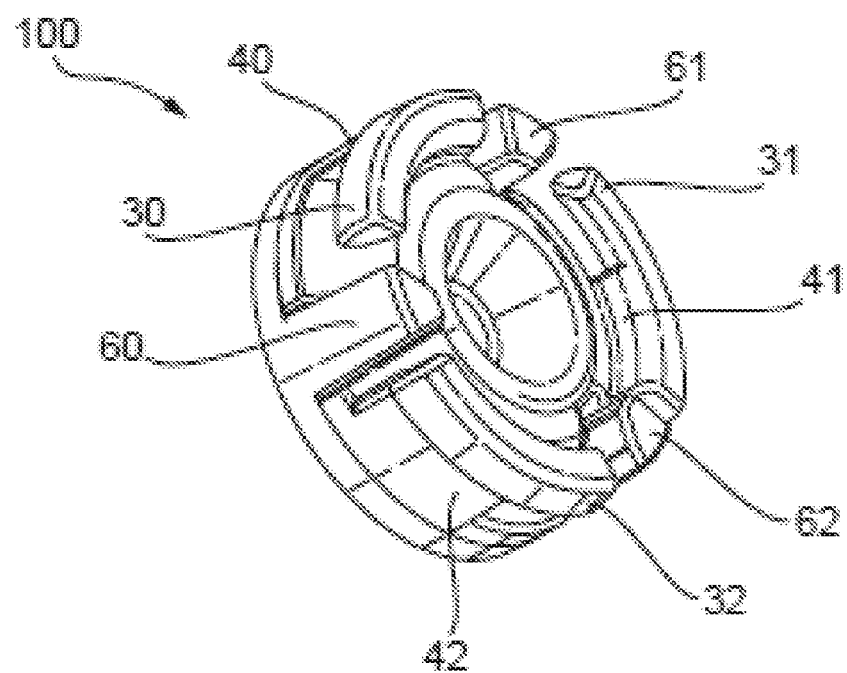
Figure 3A:
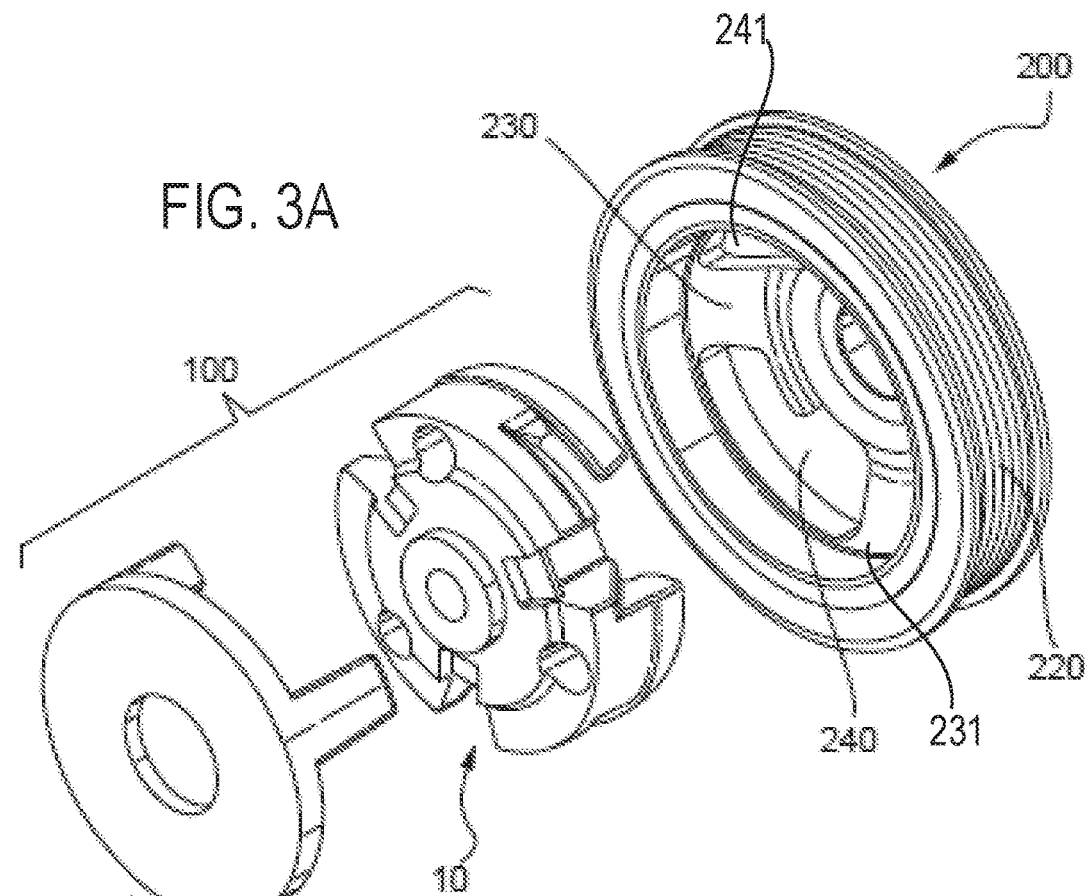
FIGS. 3A and 3B show front and rear perspective views of the vibration damper insert of FIGS. 1A and 1B during insertion into a FEAD pulley.
Figure 3B:
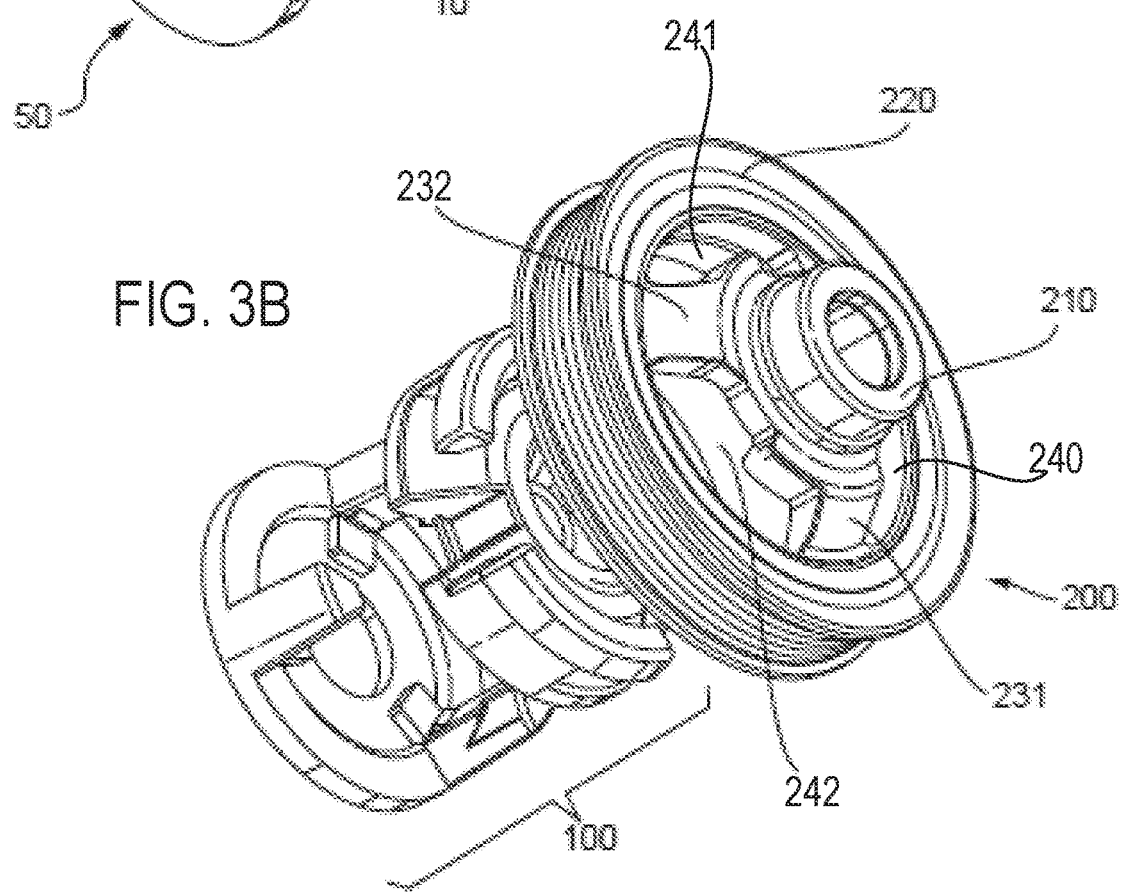
Figure 4:
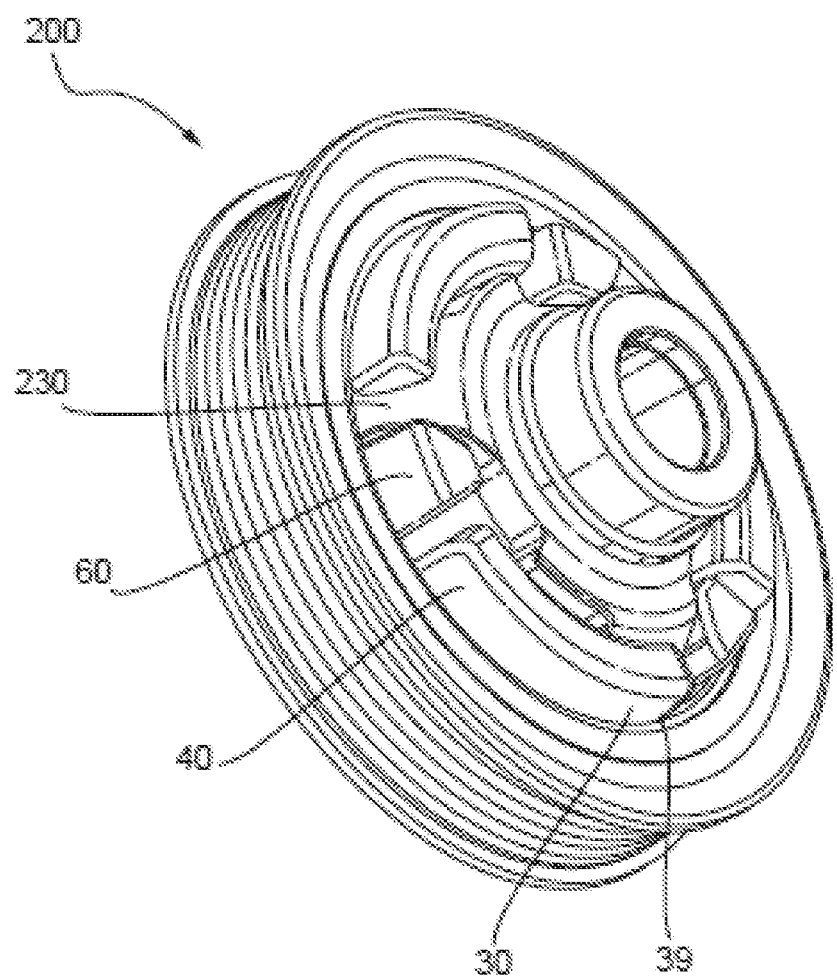
FIG. 4 is a perspective view of the vibration damper insert of FIGS. 1A and 1B inserted into a FEAD pulley.
Figure 5:
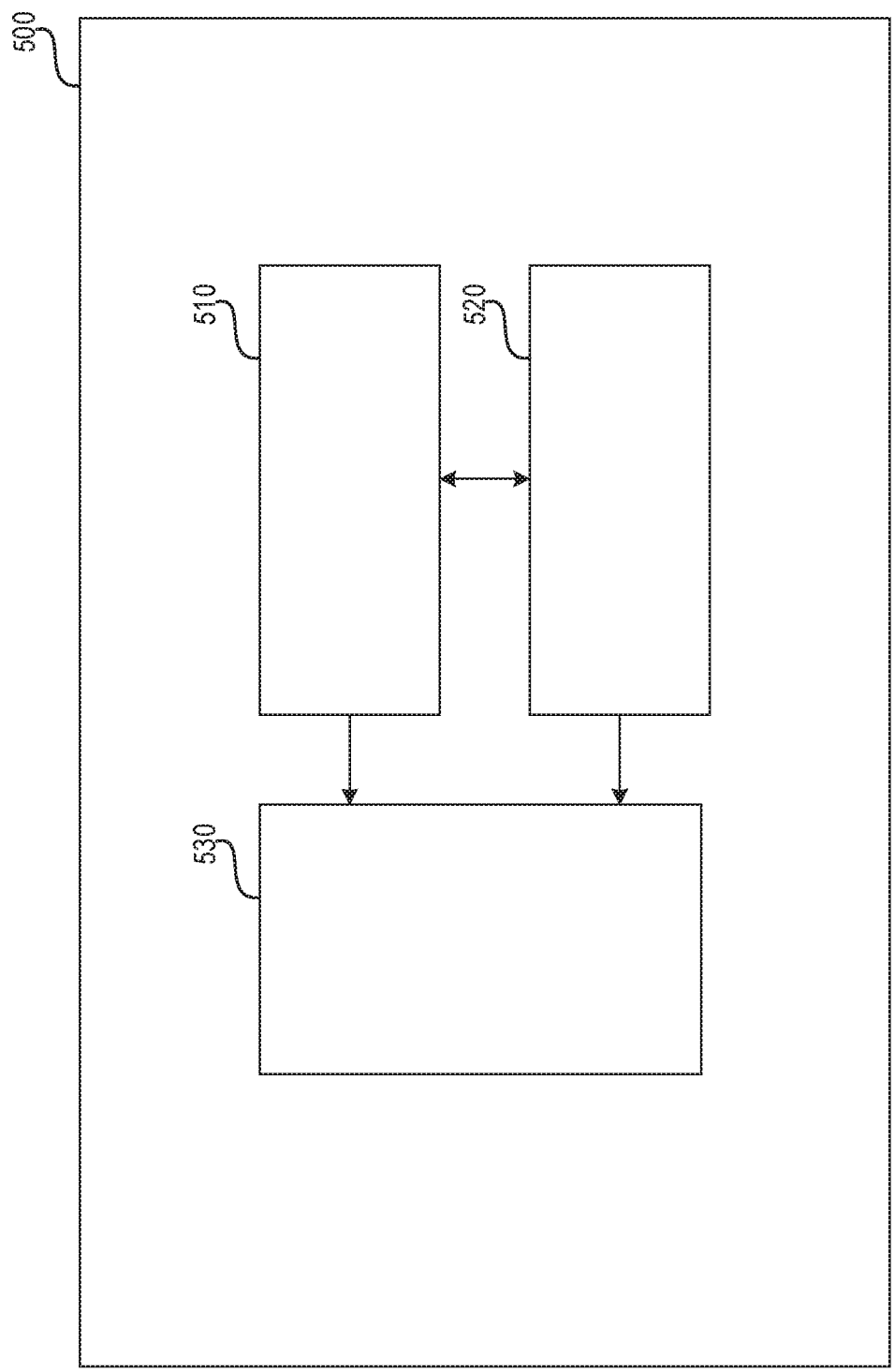
FIG. 5 shows an example of a hybrid vehicle in which the vibration damper insert may be arranged.

FIGS. 1A and 1B show, respectively, front and rear perspective views of an example vibration damper insert. FIGS. 2A and 2B show, respectively front and rear perspective views of the vibration damper insert of FIGS. 1A and 1B. FIGS. 3A and 3B show front and rear perspective views of the vibration damper insert of FIGS. 1A and 1B during insertion into a FEAD pulley. FIG. 4 is a perspective view of the vibration damper insert of FIGS. 1A and 1B inserted into a FEAD pulley. FIG. 5 shows an embodiment of a hybrid vehicle which may utilize the vibration damper insert of FIGS. 1A to 4.

FIGS. 1A-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIGS. 1A and 1B show a vibration damper insert 100 comprising a first member 10 and a second member 50. An axis system 190 is included comprise three axes, namely an x-axis parallel to a horizontal direction, a y-axis parallel to a vertical direction, and a z-axis perpendicular to the x- and y-axes.

As will be described with reference to FIGS. 3-4, the first member 10 is insertable into a pulley (not shown in FIGS. 1-2 but shown in FIGS. 3-4). For example, the pulley may be a pulley of an internal combustion engine or an electric motor. In this way, the first member 10 is rotatable within the pulley. In one example the first member 10 is insertable into a FEAD pulley including one or more of an AC compressor pulley, an alternator pulley, a water pump pulley, a crankshaft pulley, a power steering pump pulley, etc.

The first member 10 comprises a cavity 20 for receipt of the second member 50. As will be described below, when the first member 10 is inserted into a FEAD pulley and the second member 50 is inserted into the cavity 20 of the first member, the second member 50 blocks rotation of the first member 10 relative to the FEAD pulley.

The second member 50 comprises a second member limb 60. Second member limb 60 is insertable into the cavity 20 (as is shown in FIGS. 2A and 2B) such that, when the first member 10 is inserted into a FEAD pulley and the second member 50 is inserted into the cavity 20 of the first member 10, the second member limb 60 is inserted into the cavity 20. Rotation of the first member 10 relative to another article, (e.g. a FEAD pulley), may be blocked by engagement between the first member 10 and second member 50, specifically engagement between the first member 10 and the second member limb 60.

The second member 50 comprises a second member body 51 defining a second member surface 52. The second member limb 60 protrudes away from the second member body 51 and second member surface 52. The second member limb 60 may be approximately at right angles to the second member surface 52.

As is shown in FIGS. 1A and 1B, the first member 10 comprises a first member body 11 and the cavity 20 is a gap in the first member body 11. That is, the first member body 11 is a solid object and the cavity 20 represents a hole, or discontinuity, in the surface of the first member body 11. The body 11 comprises a first member surface 12 that, for illustrative purposes, may be considered to be an upper surface of the body 11 and hence an upper surface of the first member 10. The body 11 comprises a lateral surface 13 that may be a surface of the body 11 located at approximately right angles to the upper surface 12.

The cavity 20 may be provided at any location in the first member body 11. For example, the cavity 20 may be a hole, groove, opening, slot, recess, etc. in the first member surface 12 or lateral surface 13. In this way, the cavity 20 may represent a discontinuity in the first member body 11. In one embodiment, there also may be any number of features like cavity 20. That is to say, there may be one or more of the cavity 20 arranged in the first member 10.

The first member 10 comprises a first member limb 40. The first member limb 40 is a limb protruding away, and extends, from the lateral surface 13 of, the body 11 of the first member 10. The cavity 20 is at least partially defined by the first member limb 40.

The cavity 20, in one example, is a space defined by the first member limb 40 and the body 11. The first member limb 40 may be part of the lateral surface 13 of the first member body 11. For example, the first member limb 40 may be a protrusion away from the lateral surface 13, or the upper surface 12. The first member limb 40 may protrude at right-angles away from the upper surface 12 of the body 11.

The first member limb 40 comprises a protrusion 30 that extends away from the first member limb 40. The protrusion 30 extending away from the first member limb 40 defines a slot 70. Slot 70 is delimited by at least one of the first member body 11, the first member limb 40, and the protrusion 30. As shown in FIGS. 1A and 1B, the protrusion 30 is at right angles to the first member limb 40. In one example, the protrusion 30 extends in a direction perpendicular to the first member limb 40 and parallel to the first member body 11.

The cavity 20 and the slot 70 may be continuous, in that they may be one continuous space, (e.g. a gap), in the first member body 11. The slot 70 may be delimited or defined by the first member limb 40 and the protrusion 30. As will be described below, the slot 70 may be for receipt of at least part of a FEAD pulley.

The first member 10 comprises a boss 80. The boss 80 is provided in the upper surface 12 of the body 11 of the first member 10. The boss 80 extends away from the upper surface 12 of the body 11 of the first member 10. The second member 50 comprises an opening 90 for receipt of the boss 80. Opening 90 is an opening in the second member surface 52. As will be described below, when the second member 50 is inserted into the cavity 20 of the first member 10, the boss 80 is received in the opening 90 such that the second member surface 52 and the boss 80 form a single surface. The boss 80 and the opening 90 may be used to attach the first member 10 and the second member 50 together using a bolt or interference fit feature.

It will therefore be appreciated that the present disclosure provides a two-component insert 100, formed of first and second members 10, 50. The first and second members 10, 50 are connected together to form the combined insert 100.

As is shown in FIGS. 1A and 1B, the first member limb 40 is a first limb 40 and the first member 10 comprises second and third limbs 41, 42; the cavity 20 is a first cavity 20 and the first member 10 comprises second and third cavities 21, 22. The second member limb 60 is a first second member limb 60 and the second member 50 comprises second and third second member limbs 61, 62. The protrusion 30 is a first protrusion 30 and the second and third member limbs 41, 42 comprise second and third protrusions 31, 32, respectively. The slot 70 is a first slot 70 defined by the first protrusion 30, wherein the second and third protrusions 31, 32 define second and third slots 71, 72, respectively.

As will be appreciated, and as will be discussed below, when the second member 50 is inserted into the first member 10, the first member first, second and third limbs 40, 41, 42 are respectively received in first, second and third cavities 20, 21, 22, in one example.

However, the skilled person will appreciate that the disclosure is in no way limited by the example illustrated in the figures, this example being shown only to illustrate an application of the principles of the disclosure. Accordingly, a first member with any number of protruding limbs, protrusions, cavities etc. is within the scope of this disclosure.

In one example, the first member limbs 40 of the first member 10 may be referred to herein as a plurality of first member extensions including the first member extension 40, the second member extension 41 and the third member extension 42. The first member extensions may be substantially identical to one another and symmetrically arranged about the first member 10. The first member extensions may be spaced away from one another such that the first member extensions and the protrusions extending therefrom do not contact one another. A thickness of the first member extensions may be substantially equal to a thickness of the protrusions, wherein the thicknesses are measured along a radial direction. The protrusions may extend in a circumferential direction such that the protrusions do not increase a circumference of the first member 10 and do not extend toward the boss 80 in a radially inward direction. Thus, in one example, the protrusions extend along a fixed circumference of the first member 10.

In one example, the plurality of second member limbs including the first second member limb 60, the second second member limb 61, and the third second member limb 62 may be shaped to extend through the first, second, and third cavities 20, 21, and 22 of the first member. The plurality of second member limbs may be substantially identical to one another. In one example, a cross-section of the limbs taken in a radial direction comprises a trapezoidal shape. The cavities may alternate with the plurality of first member extensions such that the first cavity 20 is arranged between the first member extension 40 and the third member extension 42. The second cavity 21 may be arranged between the first member extension 40 and the second member extension 41. The third cavity 22 may be arranged between the second member extension 41 and the third member extension 42.

In one embodiment, additionally or alternatively, a plurality of tabs including a first tab 63, a second tab 64, and a third tab 65 may extend from each of the first, second, and third second member limbs 60, 61, and 62, respectively. In one example, the plurality of tabs may interact with a plurality of tab receivers of the first member 10 including a first tab receiver 23, a second tab receiver 24, and a third tab receiver 25. The first tab receiver 23, the second tab receiver 24, and the third tab receiver 25 may be arranged within the first cavity 20, the second cavity 21, and the third cavity 22, respectively. Thus, when the first, second, and third second member limbs 60, 61, and 62 extend through the first, second, and third cavities 20, 21, and 22, respectively, the first tab 63 may engage with the first tab receiver 23, the second tab 64 may engage with the second tab receiver 24, and the third tab 65 may engage with the third tab receiver 25. In one example, the engagement may comprise where the plurality of tabs and tab receivers are in face-sharing contact with one another, wherein the receivers may block the second member 50 from be inserted too far through the recesses.

Additionally or alternatively, in one example, the tabs and corresponding receivers may be omitted and replayed with a threaded central fastener, other snapping push pins, a star washer on a bolt, and/or a liquid adhesive.

In one embodiment, additionally or alternatively, the first, second, and third second member limbs may each comprise a recess at an end of the limbs distal to the second member 50. In one example, the recess may be shaped to receive an extreme end of the protrusions of the first member 10.

FIGS. 2A and 2B depict the two-piece insert 100 with the second member 50 received in, or inserted into, the first member 10. It will be appreciated that this is the configuration of the insert 100 when the insert 100 is received (e.g., assembled) in a FEAD pulley (not shown in FIGS. 2A and 2B).

FIGS. 2A and 2B show when the second member 50 is inserted into the cavity 20 of the first member 10, the second member first, second and third limbs, 60, 61, 62, are inserted into the first, second and third cavities 20, 21, 22 respectively.

FIGS. 2A and 2B also show that, when the second member 50 is inserted into the cavity 20 of the first member 10, the boss 80 is received in the opening 90 such that the boss 80 and the second member surface 52 form a single surface. In this way, correct insertion (or indeed connection) of the second member 50 into the first member 10 may be visually confirmed from a flush, continuous, interface between the second member surface 52 and the boss 80.

In one example, the boss 80 extending through the opening 90 may signal to an assembly worker that the first member 10 and the second member 50 are correctly coupled. In one example, the first member 10 and the second member 50 are correctly coupled in response to the second member limbs being fully inserted through the recesses of the first member. Additionally, as depicted in FIG. 4, the first member 10 is rotated in a direction (e.g., clockwise or counter-clockwise) to move to a locked position with a pulley (e.g., pulley 200). The second member 50 may then be inserted through recesses of the first member 10 and fixedly engage with the first member 10 to block the first member 10 from rotating out of the locked position. This may be visually verified by an assembly worker via the boss 80 extending through the opening 90 and being flush with the second member surface 52.

FIGS. 3A and 3B show the process of inserting the insert 100 into a pulley 200. The pulley 200, in one example, may be a pulley attached to an internal combustion engine or electric motor. In one example, the pulley may be attached to the engine or the electric motor of FIG. 5. In one example, the pulley 200 is a FEAD pulley. In one example the pulley 200 may be an AC compressor pulley, water pump pulley, crankshaft pulley (e.g. a crankshaft vibration damper), alternator pulley, or a power steering pump pulley.

The pulley 200 comprises an inner hub 210 and an outer hub 220. A spoke 230 connects the inner hub 210 to the outer hub 220. As is depicted in FIGS. 3A and 3B, the spoke 230 is a first spoke and the pulley 200 comprises a further spoke, second spoke 231, connecting the inner hub 210 to the outer hub 220. Furthermore, in one example, the pulley 200 comprises a third spoke 232. The pulley 200 may comprise a third spoke (not shown in FIG. 3A but shown in FIG. 3B) connecting the inner and outer hubs 210, 220.

It will be appreciated from FIGS. 3A and 3B that, to insert the insert 100 into the pulley 200, the first member 10 is inserted into the pulley 200. The first member insert 10 may initially be rotatable within the pulley 200. The first member insert 10 may then be rotated, with reference to the specific configuration shown in FIG. 3A, in a clockwise direction relative to the pulley 200 (as shown in FIG. 3A) such that at least one spoke 230, 231 is received in at least one slot 70, 71, 72 of the first member insert 10. For example, the first spoke 230 may be received in the first slot 70. When at least one spoke 230, 231, 232 is received in at least one slot 70, 71, 72 of the first member 10 the at least one spoke will engage the first member body 11 and/or at least one of the first member limb and protrusion that define the slot. For example, the first member 10 may be inserted within the pulley 200 and rotated such that the first spoke 230 is received in the first slot 70 and engages at least one of the first member body 11, the first member limb 40 and the first protrusion 30. This engagement may retain the first member 10 within the pulley 200.

In one example, there are is a space 240 arranged between each of the spokes. In one example, a number of spaces 240 is equal to the number of spokes. Thus, in the example of FIGS. 3A and 3B, there may be a first space 240 arranged between the first spoke 230 and the second spoke 231, a second space 241 arranged between the second spoke 231 and the third spoke 232, and a third space 242 arranged between the third spoke 232 and the first spoke 230. The first protrusion 30 may be inserted through the first space 240, the second protrusion 31 may be inserted through the second space 241, and the third protrusion 32 may be inserted through the third space 242. As such, the first first member limb 40 may be rotatable within the first space 240, the second first member limb 41 may be rotatable within the second space 241, and the third first member limb 42 may be rotatable within the third space 242. The first member 10 may be rotated to a locked position where the first member limbs are pressed against corresponding spokes, wherein the protrusions may at least partially overlap with a surface of the spokes facing away from the first member 10. In one example, the first first member limb 40 presses against the first spoke 230 and the first protrusion 30 is in face-sharing contact with the surface of the first spoke 230 facing away from the first member 10 in the locked position. The second first member limb 41 presses against the second spoke 231 and the second protrusion 31 is in face-sharing contact with the surface of the second spoke 231 facing away from the first member 10 in the locked position. The third first member limb 42 presses against the third spoke 232 and the third protrusion 32 is in face-sharing contact with the surface of the third spoke 231 facing away from the first member 10 in the locked position.

It will be appreciated that the structure of the pulley 200, having at least one spoke connecting inner and outer hubs, defines circumferential openings or spaces of the damper 200 between two sides of a single spoke, or between spokes. Hereafter, these spaces will be referred to as "openings" within/of the pulley 200, or "pulley openings". Two such openings are visible in the perspective views depicted in each of FIGS. 3A and 3B, respectively, to fully illustrate all three pulley openings 240, 241, and 242 between the spokes.

It will be appreciated therefore that at least a portion of the first member 10 is inserted into at least one opening of the pulley 200.

In a subsequent step, the second member 50 may be inserted into the first member 10. Specifically, the second member 50 may be inserted into the cavity 20 of the first member 10. More specifically, the second member limb 60 may be inserted into the cavity 20 of the first member 10. As will be appreciated from FIGS. 3A and 3B, the second member limb 60 is inserted into the pulley opening. This is shown in FIG. 4. More specifically, the first member 10 is inserted into the pulley opening and, thereafter, the second member limb 60 is inserted into the remaining, unoccupied, space of the pulley opening. Hence, the openings between the spokes of the pulley 200 are, when the insert 100 is inserted into the pulley, occupied by the first member 10 and the second member limb 60 (e.g. the first member limb 40 and the second member limb 60). Once the second member limbs are inserted through recesses of the first member 10 and the pulley openings of the pulley 200, the pulley openings may be sufficiently filled such that a space for the first member 10 to rotate is blocked, thereby locking the first member 10 in the locked position.

Referring to FIG. 4, the assembled pulley 200 and insert 100 are shown. FIG. 4 shows that, when insert 100 is inserted into the pulley 200, the first and second members 10, 50 are received in via pulley openings of the pulley 200. Specifically, a plurality of second member limbs including the first, second, and third second member limbs 60, 61, and 62 and a plurality of first member limbs including the first, second, and third first member limbs are received in the opening such that the first second member limb 60 is located between a spoke 230 of the pulley 200 and the first first member limb 40. In one example, the insert 100 may be a crankshaft vibration damper insert and the pulley 200 may be a crankshaft vibration damper.

The protrusion 30 of the first member 10 comprises a lip 39 such that when the first member 10 is inserted into the pulley 200, as is shown in FIG. 4, a snap-fit arrangement retains the first member 10 (and therefore the insert 100) within the pulley 200. In other words, the lip 39 extends over part of the outer hub 220 of the pulley 200 to retain the first member 10 therein. In one example, the lip 39 is arranged at a first extreme end of the protrusion 30 opposite to a second extreme end at which the protrusion 30 extends from the first member limb. In one embodiment, the lip 39 extends over a portion of a corresponding spoke to retain the first member 10 within the pulley 200.

The first member 10 and/or the second member 50 may comprise a resiliently deformable material. The first member 10 and/or the second member 50 may comprise an acoustically absorbing material.

Turning now to FIG. 5, it shows a vehicle 500 comprising an engine 510, an electric motor 520, and a FEAD 530. In one example, the vehicle 500 is a hybrid vehicle. The FEAD 530 may comprise one or more of an AC compressor pulley, a water pump pulley, a crankshaft drive pulley (e.g. a pulley coupled to a crankshaft of the engine), an alternator pulley, and a power steering pump pulley. The vibration damper insert, such as the vibration damper insert 100 of FIGS. 1A to 4, may be coupled to one or more of the engine 510, the electric motor 420, and the FEAD 530 to decrease NVH.

In this way, a cover assembly comprises two pieces, including a first member and a second member. The first member inserts into a pulley with a clearance to avoid a high insertion load. The first member may then rotate to position its protrusions behind spokes of the pulley. The second member may then be inserted into a remaining gap to block the first piece from rotating out of a locked position. The technical effect of shaping the cover assembly as two pieces is to eliminate high forces during the installation of the cover assembly and minimizes a likelihood of degradation of the spokes of the pulley and protrusions of the first member. Furthermore, the first member comprises a visual identifier that signals to an assembly worker than installation is complete and the second member is locking the first member in the locked position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An insert for a front end accessory drive (FEAD) pulley, comprising:
a first member insertable into a pulley opening of the FEAD pulley, wherein the first member is rotatable within the pulley opening in a first direction, the first member comprising a cavity for receipt of a second member, wherein the second member blocks rotation of the first member within the pulley opening in a second direction opposite the first direction, wherein the first member comprises a first member limb, wherein the first member limb is a protrusion away from a first member body, wherein at least part of the FEAD pulley is located within the cavity when the first member is inserted into the FEAD pulley and the second member is inserted into the cavity of the first member.

2. The insert of claim 1, wherein the second member comprises a second member limb insertable within the cavity and configured to block rotation of the first member relative to the FEAD pulley.

3. The insert of claim 2, wherein a combination of the second member limb and the first member limb fill an area of the pulley opening.

4. The insert of claim 1, wherein the cavity is a gap in the first member body.

5. The insert of claim 4, wherein the cavity is at least partially defined by the first member limb.

6. The insert of claim 4, wherein the first member limb extends from an outer circumference of the first member body.

7. The insert of claim 4, wherein the first member limb comprises a protrusion extending away from the first member limb and defining a slot delimited by the first member body, the first member limb, and the protrusion, wherein the slot is configured to receive an element of the FEAD pulley.

8. The insert of claim 7, wherein the protrusion comprises a lip extending away from the first member body, the lip configured to retain the first member within the FEAD pulley by a snap-fit arrangement when the first member is inserted into the FEAD pulley.

9. The insert of claim 1, wherein the first member comprises a boss extending from a first member surface and the second member comprises an opening in a second member surface, the opening configured to receive the boss, wherein the boss is arranged within the opening and flush with the second member surface in response to the second member being inserted into the cavity.

10. The insert of claim 1, wherein the FEAD pulley comprises an inner hub, an outer hub, and at least two spokes joining the inner hub to the outer hub, wherein the pulley opening is arranged between the at least two spokes, wherein the first member limb is rotatable between the at least two spokes within the pulley opening, the first member limb comprising a protrusion configured to engage with a first spoke of the at least two spokes to block separation of the first member from the FEAD pulley.

11. The insert of claim 10, wherein the second member comprises a second member limb, and wherein the second member limb extends through a recess of the first member and protrudes through the pulley opening between the protrusion and a second spoke that is different than the first spoke, wherein the second member limb blocks rotation of the first member by being in face-sharing contact with the second spoke and the protrusion.

12. A system, comprising:
a vibration cover assembly comprising a first member and a second member, wherein the first member is configured to physically couple to a plurality of spokes of a pulley to block separation of the first member from the pulley, wherein the second member engages with the first member and the pulley to block rotation of the first member within a plurality of pulley openings of the pulley in a direction away from a locked position, wherein the first member comprises a plurality of first member limbs extending from a first member body, the plurality of first member limbs extend in a direction perpendicular to the first member body, and wherein a plurality of protrusions extend from each of the plurality of first member limbs, wherein the plurality of protrusions are spaced away from the first member body and extend in a circumferential direction, wherein at least part of the pulley is located within a cavity of the first member when the first member is inserted into the pulley and the second member is inserted into the cavity of the first member.

13. The system of claim 12, wherein each first member limb of the plurality of first member limbs extends through a single pulley opening of the plurality of pulley openings, and wherein the plurality of first member limbs are rotatable within the plurality of pulley openings in a first direction toward the locked position where lips of the plurality of protrusions overlap with the plurality of spokes to retain the first member in the pulley.

14. The system of claim 13, wherein the second member comprises a plurality of second member limbs configured to extend through a plurality of recesses of the first member and through the plurality of pulley openings, wherein the plurality of second member limbs are configured to block rotation of the first member within the pulley in a second direction opposite the first direction.

15. The system of claim 14, wherein the plurality of second member limbs extends perpendicularly from a second member surface.

16. The system of claim 15, wherein the second member surface comprises an opening configured to receive a boss of the first member, wherein the boss extends through the opening and is flush with the second member surface in response to the plurality of second member limbs fully extending through the plurality of recesses and into the plurality of pulley openings.

17. The system of claim 16, wherein the first member and the second member comprises a plurality of clips configured to physically couple the second member to the first member, and wherein the boss is flush with the second member surface in response to the plurality of clips of the first member and the second member being physically coupled to one another.

18. A method of inserting an insert into a FEAD pulley, comprising:
  inserting a plurality of protrusions and a plurality of first member limbs of a first member of the insert through a plurality of pulley openings arranged between adjacent spokes of a plurality of spokes a FEAD pulley;
  rotating the first member to a locked position, wherein the locked position comprises the plurality of protrusions are arranged against surfaces of the plurality of spokes facing away from the first member; and
  inserting a plurality of second member limbs of a second member of the insert through a plurality of recesses of the first member and through the plurality of pulley openings, wherein a plurality of clips of the second member physically couple to a plurality of clip receivers of the first member.

* * * * *